(12) United States Patent
Konrad et al.

(10) Patent No.: US 6,450,447 B1
(45) Date of Patent: Sep. 17, 2002

(54) AUXILIARY POWER UNIT FOR AN AIRCRAFT

(75) Inventors: Gerhard Konrad, Ulm; Arnold Lamm, Elchingen, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/524,761

(22) Filed: Mar. 13, 2000

(30) Foreign Application Priority Data

Mar. 12, 1999 (DE) ............................................ 199 11 018

(51) Int. Cl.[7] .............................................. B64D 41/00
(52) U.S. Cl. ..................... 244/53 R; 244/58; 244/118.5
(58) Field of Search ................................ 244/53 R, 60, 244/58, 118.5; 60/39.183, 682, 683; 429/30, 31, 26, 16, 34; 204/241, 269, 270, 275

(56) References Cited

U.S. PATENT DOCUMENTS

| | | | | |
|---|---|---|---|---|
| 3,897,032 A | * | 7/1975 | Papst | 244/61 |
| 4,090,359 A | | 5/1978 | Doellner | 60/39.69 |
| 4,091,613 A | * | 5/1978 | Young | 60/39.07 |
| 5,083,425 A | * | 1/1992 | Hendriks et al. | 60/39.183 |
| 5,106,035 A | * | 4/1992 | Langford, III | 244/59 |
| 5,413,879 A | | 5/1995 | Domeracki et al. | 429/30 |
| 5,417,051 A | * | 5/1995 | Ankersit et al. | 60/39.02 |
| 5,541,014 A | | 7/1996 | Micheli et al. | 429/19 |
| 5,589,758 A | * | 12/1996 | Blackmon et al. | 322/100 |
| 5,693,201 A | | 12/1997 | Hsu et al. | 204/241 |
| 6,119,979 A | * | 9/2000 | Lee et al. | 244/61 |

FOREIGN PATENT DOCUMENTS

| | | |
|---|---|---|
| DE | 40 01 684 | 7/1991 |
| DE | 196 00 936 | 8/1996 |
| EP | 0 391 595 | 10/1990 |

* cited by examiner

Primary Examiner—Galen L. Barefoot
(74) Attorney, Agent, or Firm—Crowell & Moring LLP

(57) ABSTRACT

An auxiliary power unit for an aircraft includes a gas turbine with a combustion chamber a compressor and a turbine. A compressor is coupled with the turbine, for generating compressed air. A fuel cell (BZ) is present for generating electric energy.

19 Claims, 3 Drawing Sheets

Fig. 1: PRIOR ART

AUXILIARY POWER UNIT FOR AN AIRCRAFT

BACKGROUND AND SUMMARY OF THE INVENTION

This application claims the priority of Germany patent Document 199 11 018.2, filed Mar. 12, 1999, the disclosure of which is expressly incorporated by reference herein.

The invention relates to an auxiliary power unit for aircraft, abbreviated APU.

It is an object of the auxiliary power unit on board aircraft to generate compressed air for air conditioning the cabin and starting the power unit and to generate electric energy for the on-board power supply. The auxiliary power unit will be used mainly when the aircraft is on the ground and permits a supply of the aircraft independently of external sources. Furthermore, the auxiliary power unit is partially used as a safety system in the case of an engine failure for relieving the remaining main engines during the flight.

Systems which are currently in use have the construction schematically illustrated in FIG. 1. The illustrated auxiliary power unit comprises a gas turbine GT which, as essential components, has a compressor V, a combustion chamber BK as well as a turbine T. By way of a common shaft, the turbine T drives a compressor K for generating compressed air (for example, 3 bar for supplying the cabin air-conditioning system). A generator GN for generating electric energy (for example, 380 V/400 Hz for the on-board power supply) is also coupled with the turbine T. By way of a transmission, additional auxiliary power units can be driven by means of the gas turbine GT.

The disadvantage of the known auxiliary power units is their relatively poor efficiency, particularly with respect to generating electricity. Their operation is also connected with high exhaust gas and noise emissions.

Furthermore, in vehicle construction, the use of fuel cells is known for driving purposes as well as for supplying electric energy.

It is an object of the invention to provide an auxiliary power unit by means of which electricity can be generated on board at a high efficiency and while reducing emissions.

This task is achieved by providing an auxiliary power unit of the above described general type, characterized in that a fuel cell is present for generating electric energy.

According to the invention, the electricity generating part of the conventional auxiliary power unit is replaced by a fuel cell system.

In the case of conventionally powered aircraft, the hydrogen required by the fuel cell can be generated by a suitable hydrogen generating unit, particularly a reformer stage, from the aviation gasoline/kerosine present on board. As an alternative, the hydrogen for the operation of the auxiliary power unit could also be carried along in a tank.

In the case of a hydrogen plane, in which the fuel carried along for the propulsion of the aircraft is liquid hydrogen, the fuel cell can be supplied directly with the hydrogen present on board.

Therefore, on the whole, in the case of conventional airplanes as well as in the case of hydrogen airplanes, the electric energy can be generated from the fuel for the propulsion of the aircraft which is present on board anyhow. As an alternative, an external supply on the ground is also conceivable.

For the air supply to the fuel cell, particularly the following embodiments can be used:

In a preferred embodiment, the compressing of the fuel cell process air takes place by means of the compressor which is coupled with the turbine and which also generates the compressed air for the on-board air-conditioning system.

In another embodiment, the fuel cell is supplied with air by way of the compressor of the gas turbine.

As an alternative, one or several additional compressor stages can be present on the turbine shaft, specifically for the compressing of the fuel cell process air.

The air supply to the fuel cell can also be achieved by a cooling ventilator present in the auxiliary power unit for cooling purposes. In this embodiment, the fed process air has a relatively low pressure level.

If a pneumatic on-board air-conditioning system with an expansion turbine exists on board, this expansion turbine can be used for feeding and compressing the process air.

In order to utilize the energy content of the fuel cell waste gases, the anode waste gas as well as the cathode waste gas can be introduced into the combustion chamber of the gas turbine. Typically, only a fraction of approximately 80% of the fed hydrogen can be utilized in the fuel cell. The energy content of the waste gas is sufficient for covering approximately 30 to 50% of the compression energy to be applied for the fuel supply to the fuel cell.

Particularly, a PEM fuel cell (Proton Exchange Membrane fuel cell) can be used as the fuel cell.

Summarizing, the following advantages of the auxiliary power unit according to the invention are obtained:

Generating electricity at a high efficiency and from fuel which already exists on board the aircraft;

reduction of the fuel consumption as well as of the exhaust gas and noise emissions;

extensive uncoupling of the generating of electricity and the air compression;

increase of the efficiency particularly also in the partial load operation;

no separate compressor is required for the air supply to the fuel cell; on the contrary, the devices for the air compression existing on board can be used.

Other objects, advantages and novel features of the present invention will become apparent from the following detailed description of the invention when considered in conjunction with the accompanying drawings.

DETAILED DESCRIPTION OF THE DRAWINGS

Figure 1:
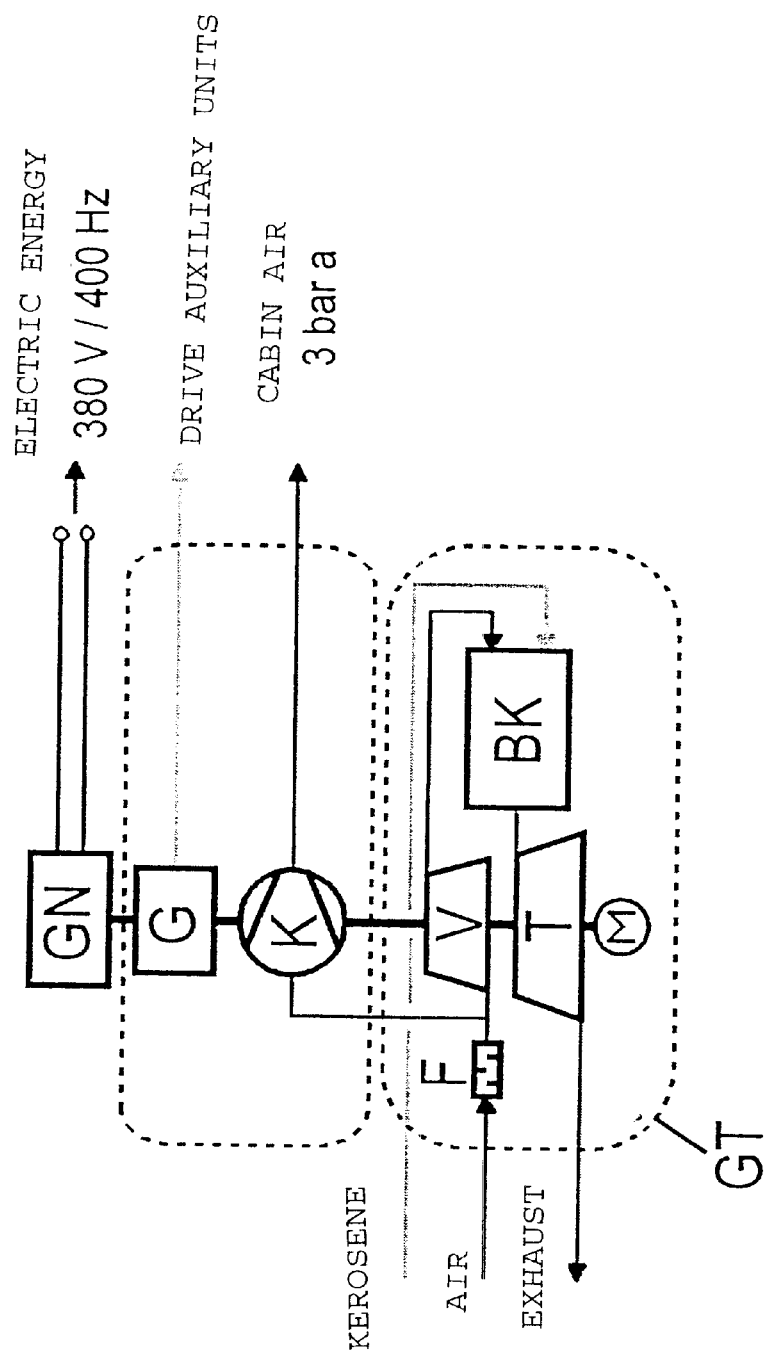
FIG. 1 is a schematic view of a known auxiliary power unit, as explained in the introduction to the specification.
Figure 2:
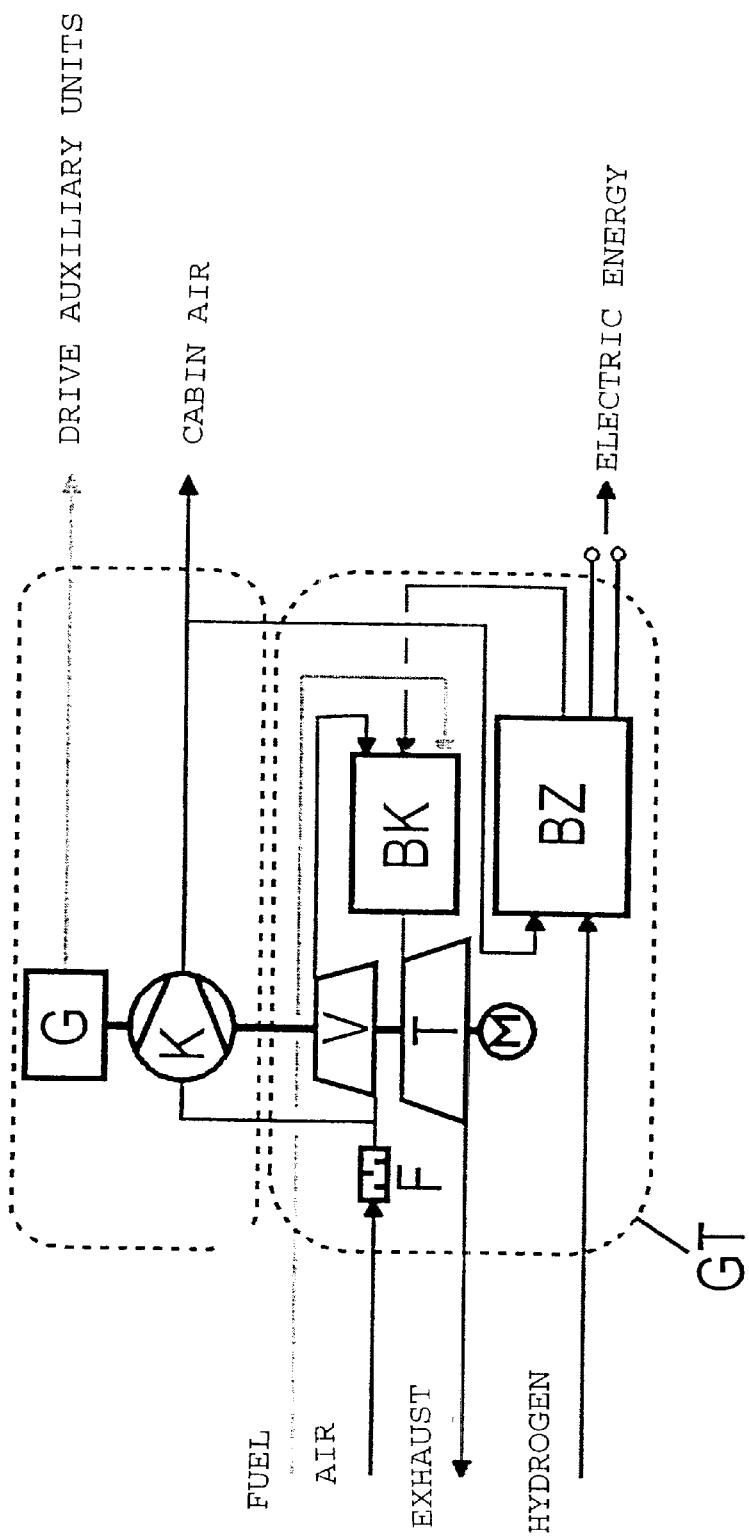
FIG. 2 is a schematic view of a first embodiment of the auxiliary power according to the invention.

FIG. 2 illustrates an embodiment of the auxiliary power unit according to the invention for a hydrogen airplane. In the case of a hydrogen airplane, the main engines for the propulsion of the airplane are supplied with hydrogen so that, independently of the auxiliary power unit, hydrogen is already present on board. The illustrated auxiliary power unit comprises a gas turbine GT with a compressor V for compressing the ambient air taken in by way of an air filter F, a combustion chamber BK operated by means of hydrogen as well as a turbine T which converts the kinetic energy of the combustion chamber waste gases into shaft output.

The compressor V and the turbine T are coupled with one another and are disposed on the same shaft. A compressor K for generating compressed air for the air conditioning of the cabin is also coupled with the turbine T.

In this embodiment, the cabin air is branched off from the inflow of the gas turbine GT. By way of the transmission G also coupled with the turbine G, optionally additional assemblies (such as the fuel pump, the cooling ventilator, the lubricant supply) can be driven. M marks the electric starter of the auxiliary power unit.

According to the invention, the electric energy for the on-board power supply is generated by a fuel cell BZ. The hydrogen for the fuel gas supply of the fuel cell BZ is taken from the hydrogen tanks of the aircraft. In this embodiment process air is supplied to the fuel cell BZ by way of the compressor K coupled to the turbine T, which compressor K also generates the compressed air for the cabin air-conditioning system. For this purpose, compressed air is branched off the compressed air line for the cabin air and is guided to the anode inlet of the fuel cell BZ. In order to utilize the energy content of the fuel cell waste gas, the waste gas of the fuel cell BZ is guided into the combustion chamber BK of the gas turbine GT.

Figure 3:
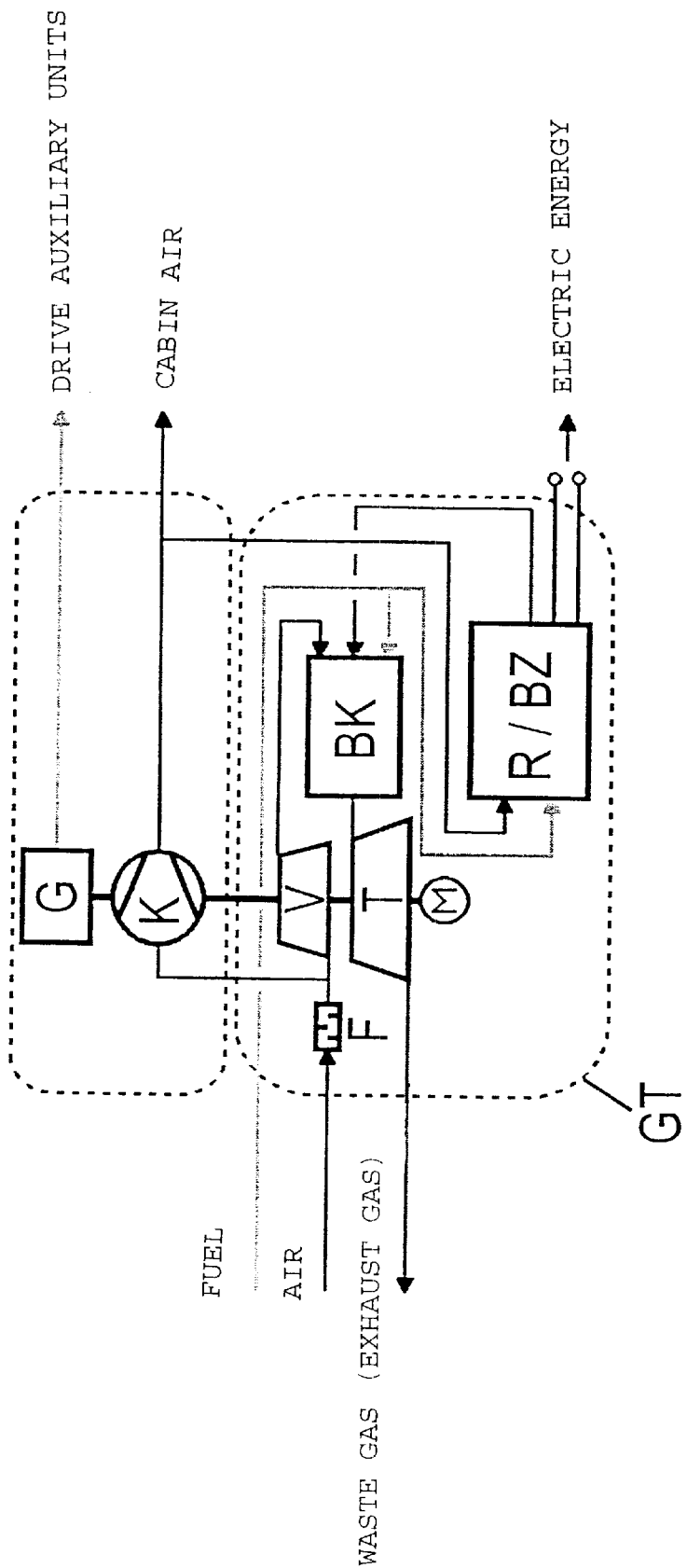
FIG. 3 is a schematic view of another embodiment of the auxiliary power unit according to the invention.

FIG. 3 shows an embodiment of the auxiliary power unit according to the invention for a conventionally powered airplane, that is, an airplane powered with kerosine/aviation gasoline. The construction of the illustrated auxiliary power unit corresponds essentially to the auxiliary power unit illustrated in FIG. 2. Reference is made to FIG. 2 for avoiding repetitions. In contrast to the auxiliary power unit according to FIG. 2, the hydrogen for the fuel cell in this embodiment is generated on-board from the kerosine carried along. For this purpose, a reformer stage R—which is not shown in detail—is connected in front of the fuel cell BZ.

In this embodiment, the combustion chamber BK of the gas turbine GT is operated with kerosine/aviation gasoline. The residual gas of the fuel cell system is fed to the combustion chamber BK of the gas turbine GT. As a result, its energy content can be utilized. In this case, it is particularly advantageous that, by also burning the hydrogen, a considerable reduction of emissions is achieved.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Auxiliary power unit for an aircraft, comprising:
   a gas turbine unit (GT) having a combustion chamber (BK), a compressor (V), and a turbine (T),
   a compressor (K) which is coupled to the turbine (T), for generating compressed air, and
   a fuel cell (BZ) for generating electric energy, wherein the compressor (K) coupled with the turbine (T) is used to compress process air to be fed to the fuel cell and to be used by the fuel cell to produce electricity.

2. Auxiliary power unit according to claim 1,
   wherein compressing of the process air to be fed to the fuel cell (BZ) takes place by means of the compressor (V) of the gas turbine unit (GT).

3. Auxiliary power unit according to claim 1,
   wherein, for compressing of process air to be fed to the fuel cell (BZ), one or several additional compressor stages are present which are coupled with the turbine (T).

4. Auxiliary power unit according to claim 1,
   wherein a hydrogen generating unit is present by means of which the hydrogen to be fed to the fuel cell (BZ) is generated on board.

5. Auxiliary power unit according to claim 4,
   wherein the hydrogen generating unit generates hydrogen from fuel carried along on board for the propulsion of the aircraft.

6. Auxiliary power unit according to claim 1,
   wherein tanks are present on board the aircraft for storing hydrogen from which the fuel cell is supplied with hydrogen.

7. Use of an auxiliary power unit according to claim 6 in a hydrogen airplane.

8. Auxiliary power unit according to claim 1,
   wherein anode and/or cathode waste gas of the fuel cell (BZ) is fed to the combustion chamber (BK) of the gas turbine (GT).

9. Auxiliary power unit according to claim 8,
   wherein the hydrogen generating unit generates hydrogen from fuel carried along on board for the propulsion of the aircraft.

10. Auxiliary power unit for an aircraft, comprising:
    a gas turbine unit (GT) having a combustion chamber (BK), a compressor (V), and a turbine (T),
    a compressor (K) which is coupled to the turbine (T), for generating compressed air,
    a fuel cell (BZ) for generating electric energy, and
    a cooling ventilator for cooling purposes, this cooling ventilator being used for the compression of process air to be fed to the fuel cell (BZ) and to be used by the fuel cell (BZ) to produce electricity.

11. Auxiliary power unit according to claim 10,
    wherein a hydrogen generating unit is present by means of which the hydrogen to be fed to the fuel cell (BZ) is generated on board.

12. Auxiliary power unit according to claim 10,
    wherein tanks are present on board the aircraft for storing hydrogen from which the fuel cell is supplied with hydrogen.

13. Auxiliary power unit according to claim 12,
    wherein the hydrogen generating unit generates hydrogen from fuel carried along on board for the propulsion of the aircraft.

14. Auxiliary power unit for an aircraft, comprising:
    a gas turbine unit (GT) having a combustion chamber (BK), a compressor (V), and a turbine (T),
    a compressor (K) which is coupled to the turbine (T), for generating compressed air,
    a fuel cell (BZ) for generating electric energy, and
    an expansion turbine of a pneumatic on-board air conditioning system of the aircraft that is used for compressing process air to be fed to the fuel cell (BZ) and to be used by the fuel cell (BZ) to produce electricity.

15. Auxiliary power unit according to claim 14,
    wherein a hydrogen generating unit is present by means of which the hydrogen to be fed to the fuel cell (BZ) is generated on board.

16. Auxiliary power unit according to claim 14,
    wherein tanks are present on board the aircraft for storing hydrogen from which the fuel cell is supplied with hydrogen.

17. An aircraft comprising a propulsion unit for propelling the aircraft and an auxiliary power unit operable independently of the propulsion unit, wherein the auxiliary power unit may be used to generate compressed air for air conditioning, to start the propulsion unit and to generate electric energy, said auxiliary power unit comprising:

- a gas turbine unit (GT) with a combustion chamber (BK), a compressor (V), and a turbine (T),
- a compressor (K) which is coupled with the turbine (T), for generating compressed air, and
- a fuel cell (BZ) for generating electric energy, wherein the compressor (K) is used to compress process air to be fed to the fuel cell and to be used by the fuel cell to produce electricity.

18. An aircraft according to claim 17, wherein anode and/or cathode waste gas of the fuel cell (BZ) is fed to the combustion chamber (BK) of the gas turbine (GT).

19. An aircraft according to claim 17, wherein the propulsion unit is a hydrogen propulsion unit and hydrogen storage tank means are carried by the aircraft, and wherein hydrogen from the storage tank means is fed to the fuel cell (B7).

\* \* \* \* \*